United States Patent [19]

Douwes

[11] Patent Number: 4,755,982
[45] Date of Patent: Jul. 5, 1988

[54] DISC CASSETTE

[75] Inventor: Marcelles B. M. Douwes, Nuenen, Netherlands

[73] Assignee: U.S. Philips Corporation, New York, N.Y.

[21] Appl. No.: 8,513

[22] Filed: Jan. 29, 1987

[30] Foreign Application Priority Data

Jul. 21, 1986 [NL] Netherlands ................... 8601884

[51] Int. Cl.$^4$ .................. G11B 5/82; G11B 17/00
[52] U.S. Cl. ........................... 369/291; 206/312; 360/133; 369/77.2
[58] Field of Search ............ 369/291, 77.2; 360/133; 206/312, 444

[56] References Cited

U.S. PATENT DOCUMENTS

| 3,842,194 | 10/1974 | Clemens | 369/283 |
| 4,133,540 | 1/1979 | Torrington | 369/77.2 |
| 4,138,703 | 2/1979 | Stave et al. | 360/133 |
| 4,239,238 | 12/1980 | Coleman | 369/77.2 |
| 4,421,866 | 12/1983 | Suh et al. | 521/79 |
| 4,439,851 | 3/1984 | Kiguchi | 369/77.2 |
| 4,451,912 | 5/1984 | Kirschner | 369/77.2 |
| 4,463,849 | 8/1984 | Prusak et al. | 369/291 |
| 4,644,521 | 2/1987 | Davis et al. | 369/77.2 |

FOREIGN PATENT DOCUMENTS

| 56-58177 | 5/1981 | Japan. | |
| 2124819 | 2/1984 | United Kingdom | 360/133 |

Primary Examiner—Steven L. Stephan
Attorney, Agent, or Firm—F. Brice Faller

[57] ABSTRACT

A disc cassette includes a rotatable disc (1) contained in a disc-receiving space of an external enclosure (2), a front opening of the enclosure being closed by a closing member (7) which is latched in the enclosure by means of one or more resilient latching fingers (8) to retain the disc. The latching finger (8) pivots in a direction perpendicular to the plane of the disc (1) and cooperates with the side wall of a latching recess (12) formed in the inner side wall of the enclosure. A slot (15) formed in the main wall (3) of the enclosure (2) extends from the front opening of the enclosure into the latching recess but has a width which is smaller than the width at the latching recess and smaller than the width of the latching finger, and the end portion of the slot (15) which terminates in the front opening of the enclosure is covered by the portion (7A) of the closing member which projects from the enclosure. This enables the latching finger to be pivoted towards the released position by external means and it also enables gripping means of a playing apparatus to engage, via the slot, behind the portion (7A) of the closing member (7) which projects from the enclosure in order to withdraw the released closing member from the enclosure (2).

4 Claims, 2 Drawing Sheets

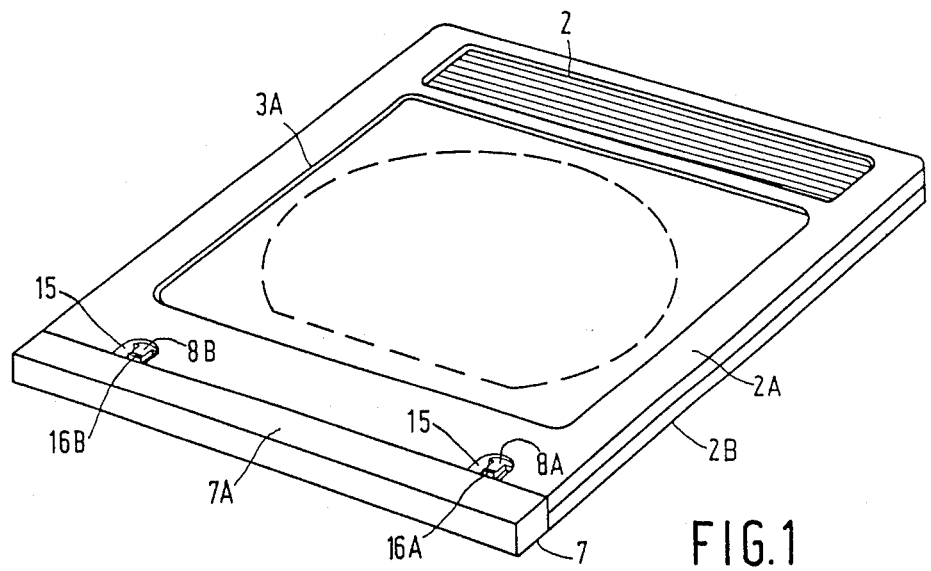
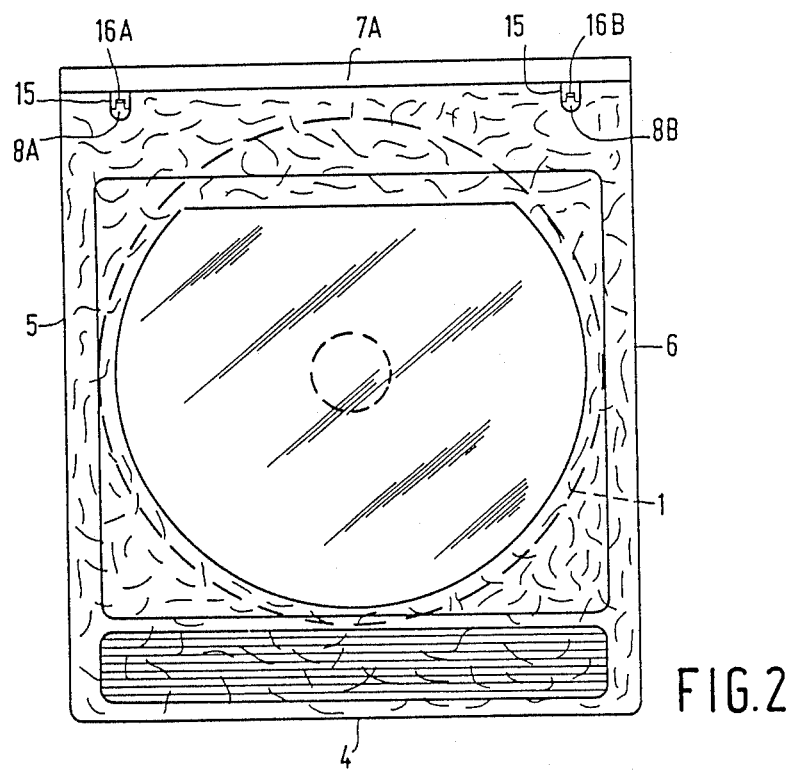

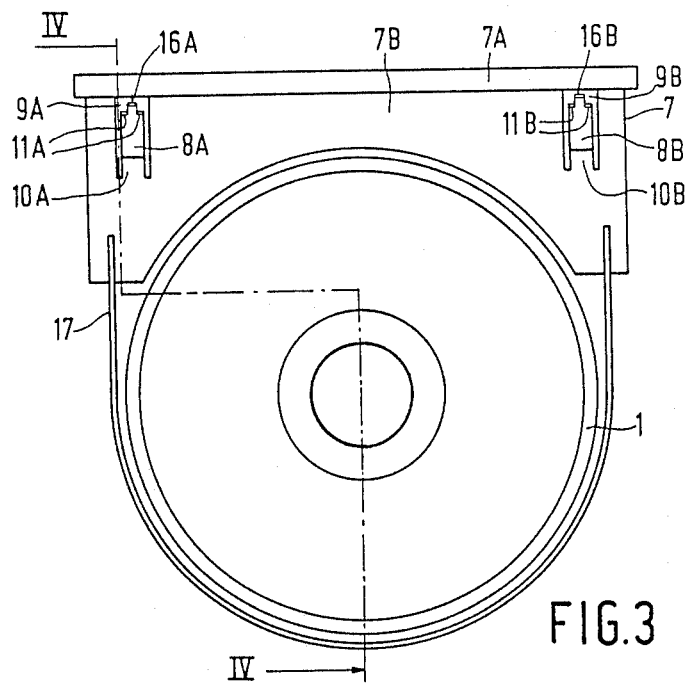
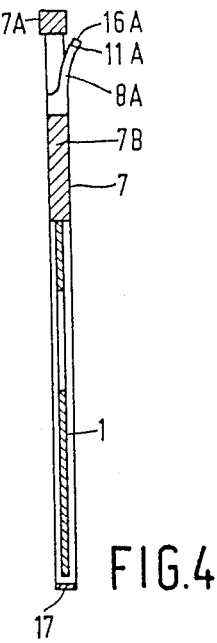
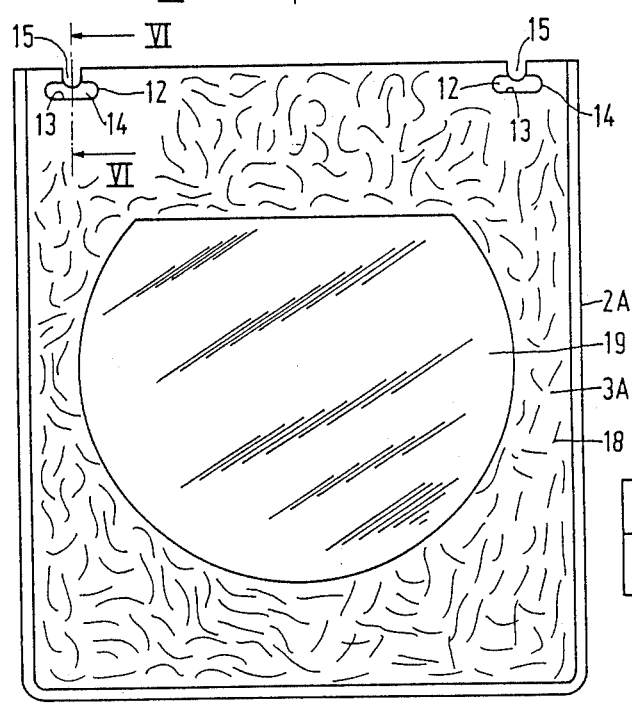
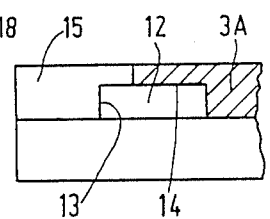

DISC CASSETTE

BACKGROUND OF THE INVENTION

The invention relates to a disc cassette for use in a system for storing/reading information.

U.S. Pat. No. 4,239,238 (herewith incorporated by reference) discloses a cassette of the type comprising an external enclosure and a closing member received therein. The enclosure has parallel main walls, three side walls, and a front opening which communicates with a disc receiving space. The closing member is situated partly inside and partly outside the enclosure and closes the front opening. A latching finger on the closing member cooperates with a recess in a main wall of the enclosure to hold the closing member in the enclosure. The known disc cassette contains a video disc provided with video information which is stored in the disc in the form of geometrical variations in the bottom of a continuous spiral groove formed on the disc surface. The variations in the capacitance between an electrode of a stylus which slides in the grooves and an electrically conductive layer on the surface of the disc are detected in order to reproduce the stored information. Such a video-disc system based on capacitance variations is described comprehensively in U.S. Pat. No. 3,842,194 (herewith incorporated by reference).

In such systems it is advantageous to accommodate the disc in a cassette having an enclosure which is closed by means of a closing member provided with a disc extractor in the form of a plastic strip which surrounds the periphery of the disc with clearance. To play the disc, a cassette containing the disc is inserted into a playing apparatus having a disc-extraction mechanism which removes the disc from the enclosure during the subsequent withdrawal of the enclosure, so that the disc remains in the player. The player is equipped with a turntable which supports the disc for the subsequent playing operation. After playing the empty enclosure is reinserted into the player and is subsequently removed from the player together with the disc and the closing member. Discextration mechanisms suitable for cooperation with such disc cassettes are known, for example, from U.S. Pat. Nos. 4,089,511, 4,421,866 and 4,133,540.

It is desirable to ensure that a disc contained in an enclosure cannot inadvertently fall out of the enclosure. Further, it is desirable that the closing member cannot readily be removed from the enclosure outside the apparatus. Therefore, the closing member comprises pivotal latching fingers which in conjunction with the latching recesses formed inside the enclosure effectively latch the closing member in the enclosure. When a filled disc cassette is inserted into the player the latching fingers are pivoted to their released positions. This enables the closing member to be removed and hence the disc to be removed from the enclosure inside an apparatus.

U.S. Pat. No. 4,352,174 (herewith incorporated by reference). Discloses a disc cassette provided with a video disc which must be scanned capacitively but which is not grooved. Like the video disc mentioned in the foregoing this disc must also be protected against dust and touching. Therefore, the disc is again accommodated in an enclosure, which is closed by a closing member which is latched in the enclosure by means of latching fingers. The disc cassette is inserted into a player, after which the closing member is released by suitable means provided in the player and is removed from the enclosure together with the disc during withdrawal of the enclosure from the player. The disc and the closing member can be reinserted into the enclosure by sliding the enclosure into the player, so that the disc with the closing member are replaced and the closing member is latched in the enclosure. The closing member is not provided with disc-extraction means. The player is equipped with an extraction mechanism which slightly opens the enclosure of a disc cassette inserted into the player and grips the edge of the disc around the closing member by means of a gripper. This enables the disc and the closing member to be simultaneously withdrawn from the enclosure.

Protection against touching, dust and environmental influences is not only desirable for capacitively scanned video discs but also for various other types of disc. In general, these are discs of a type on which information is stored with a very high density, necessitating a very accurate scanning of the disc surface. This category not only includes video discs but also magnetic storage discs, optical audio discs and video discs, as well as optically readable computer storage discs of the recordable or non-recordable type. Despite the extremely high information density normal optical audio and video discs do not employ disc cassettes. However, the player comprises electronic correction circuits which synthesize the missing information in the event that the information structure cannot be read owing to the presence of dust or the like. In the case of optically readable storage discs in which each information element may be essential such corrections are permissible only to a limited extend. In the event that reading of the information is locally impaired by the presence of dust, scratches, fingermarks or other flaws, this may have undesirable and sometimes even serious consequences.

The prior art also teaches disc cassettes in which the disc is not removed from the enclosure but remains in the enclosure in order to be scanned by the player. The enclosure should provide enough room and should have apertures which can be closed and which provide access to the disc surface for the customary scanning means. Therefore, such disc cassettes have larger dimensions and require the presence in the player of means for opening the access slot which can be closed and, in some cases, the central opening for the passage of a drive spindle.

In most disc cassettes known from the above United States Patent Specifications the latching fingers are situated on the two lateral sides of the closing member. The latching fingers pivot in the plane of the closing member and the associated latching recesses are provided in the corresponding lateral side walls of the enclosure. Near the side walls apertures are formed in the front side of the closing member, through which apertures release means of the disc player can enter the enclosure to bend the latching fingers towards their released positions. The gripping means in the player engage around the portion of the closing member which projects from the enclosure, after which the enclosure can be withdrawn, leaving the closing member and the disc behind. Care must be taken that when the enclosure is reinserted into the player the latching means no longer keep the latching fingers of the closing member in their released positions, because otherwise the closing member is not latched in the enclosure and consequently the enclosure cannot take up the closing member and the disc. The release means of the disc players are therefore constructed in such a way that during or after withdrawal of the enclosure the release means are set to another position, so that these means no longer load the latching fingers are not disposed in the path of an enclosure to be inserted subsequently.

However, the first-mentioned U.S. Pat. No. 4,239,238 also describes a construction of a disc cassette in which the latching fingers are not arranged on the lateral sides of the closing member to cooperate with latching recesses in the lateral side walls of the enclosure, but in which the latching fingers are disposed substantially within the plane of the closing member and are pivotable in a direction perpendicular thereto to cooperate with latching recesses in a main wall of the enclosure. For pivoting the two latching fingers and for subsequently withdrawing the closing member and the disc from the enclosure the disc player employs a combined release and extraction means which penetrates into the front opening of the enclosure. The latching finger extends into the front opening and at this location it comprises a hook-shaped portion. The latching member of the disc player pivots the latching fingers towards the released positions and also engages behind the hook-shaped portion to withdraw the disc holder with the disc from the enclosure. After removal of the enclosure the latching finger pivots back elastically and thereby pivots the release and extraction means of the disc player into an inoperative position. This enables the closing member to be reinserted and latched in the enclosure. A disadvantage of this cycle of operations is that during the release and withdrawal of the closing member from the enclosure the latching fingers are pivoted against spring force and a reactive force is exerted on the facing main wall of the enclosure. This force gives rise to the front side being bent open and may lead to permanent deformation and damaging of the enclosure. This is induced by the fact that the main wall is locally bevelled towards the front opening down to a very small wall thickness. The latching finger may be made less rigid but this renders the finger more vulnerable. This construction is not very suitable for further miniaturisation, because the problem will then become even more serious. Another disadvantage is that the hook-shaped portion of the latching finger is necessarily small. Nevertheless this hook-shaped portion has to be subjected to the force required for withdrawing the disc with the closing member from the enclosure. Under unfavourable conditions this may give rise to damaging or rapid wear of the hook-shaped portion, thereby rendering the disc cassette unserviceable. Such unfavourable conditions may occur if the closing member and/or the disc jam in the enclosure, for example, as a result of deformation of this enclosure. Another disadvantage is that the latching fingers have a double function, because they serve both for latching the closing member in the enclosure and for withdrawing the closing member from the enclosure. It is not always desirable that such a part performs more than one function and it may be more advantageous to optimise this part for only one function. Other functions impose different requirements, so that a part which serves several functions cannot always be optimised in all respects.

In all disc cassettes of the type described, in which the closing member is removed from the enclosure after it has been released, openings are necessarily at the front side of the closing member for the passage of release means of the apparatus. Gripping means grip around the portion of the closing member which projects from the enclosure-or at least a part thereof-in order to withdraw the closing member from the enclosure, except in the construction of a disc cassette where the latching finger is pulled.

SUMMARY OF THE INVENTION

It is the object of the invention to provide a disc cassette in which the latching fingers themselves need not be pulled in order to remove the closing member and the disc from the enclosure, and in which no openings are necessary in the front of that portion of the closing member which projects from the enclosure. To this end the main wall in which the latching recess is present is formed with a slot which extends from the front opening of the enclosure into the latching recess, and in that the width of the slot is smaller than the width of the latching recess and smaller than the width of the abutment portion of the latching finger. The portion of the closing member which projects from the enclosure covers the end portion of the slot in such a way that the latching finger can be pivoted towards the released position by external means and subsequently the closing member can be slid out of the enclosure by external gripping means which engage behind the portion of the closing member which covers the slot.

The presence of an opening in the main wall directly above the free end of the latching finger enables the closing member to be gripped and released at one location and, if desired, in one movement. Since the slot terminates in the front opening of the enclosure there are no obstacles which can impede the withdrawal of the closing member form the enclosure. As the gripper can engage behind the portion of the closing member which projects from the enclosure, the dimensions of the portion which projects from the enclosure can be smaller than necessary when the gripper would have to engage with portions of the closing member which project from the enclosure. This enables the dimensions of the disc cassette to be reduced to a certain extent. The presence of openings at the front of the closing member and the absence of profiled portions for cooperation with the gripper of the apparatus enable the appearance of the closing member at its front side to be simpler and smoother. As the closing member is generally injection molded plastic, this shape has advantages both in respect of a more attractive appearance and in respect of a simple manufacture at low cost.

A consequence of the use of a disc which is removable from an enclosure together with the closing member is that care must be taken that when the enclosure is reinserted into the player so that the enclosure will cooperate correctly with the closing member even if the enclosure has been turned upside down. The disc and the closing member, which are together inserted into the disc player, have a fixed position relative to one another. However, outside the disc player the enclosure is handled as a separate part and therefore it is not unlikely that it is in another position before reinsertion in the apparatus. The disc cassette known from U.S. Pat. No. 4,239,238 contains a video disc which can be played on both sides. Steps have been taken to ensure that the closing member is always latched correctly in the enclosure. There are provided two latching fingers which are disposed symmetrically relative to the centre and which are pivotable in opposite directions. The enclosure has two latching recesses, one in each of the main walls, in such a way that regardless of the two possible ways in which the closing member is slid into the enclosure each latching finger always engages the associated latching recess with its abutment portion. The presence of two latching fingers is a practical advantage because it ensures a correct latching of the closing member in the enclosure and prevents an oblique position of the closing member relative to the enclosure.

The disc cassettes for video discs described above contain discs which can be played on both sides. The release mechanisms and gripping mechanisms provided in the associated disc players must always cooperate correctly with the disc cassette, both with the first side and with the second side of the disc facing upwards. An embodiment of the invention which is suitable for other uses is characterized in that the disc can be inscribed/-read on one side only. The closing member comprises two latching fingers, the latching positions of the two latching fingers are situated at the same side of the closing member, and the enclosure has two shells which are secured to one another and which have latching recesses and slots at identical locations. No matter which of the two possible ways the closing member has been slid into the enclosure, each latching finger always engages an associated latching recess with its abutment portion, each of the shells, having two latching recesses with slots which are disposed symmetrically relative to the centre of the front opening.

Some discs, for example optical audio discs and some optically readable computer storage discs, can only be read on one side. With discs of this type it is desirable to construct the disc cassette and the player in such a way that the disc can be removed from the enclosure in one position only.

As the enclosure for a disc which is played on one side only can also be constructed wholly symmetrically in such a way that it always takes up the disc and the closing member in the correct manner, it may be advantageous for the shells forming the enclosure to be identical to each other. Part of the enclosure may be transparent plastic, so that when the disc cassette is filled it is possible to distinguish one side of the disc from the other.

BRIEF DESCRIPTION OF THE DRAWING

FIG. 1 is a perspective view of a filled disc cassette in,

FIG. 2 is a plan view of the disc cassette shown in FIG. 1,

FIG. 3 is a plan view of a closing member/disc unit when removed from the enclosure of the disc cassette shown in FIGS. 1 and 2, FIG. 4 is a sectional view taken on the lines IV—IV in FIG. 3, FIG. 5 shows the inner side of a shell for an enclosure of the disc cassette as shown in the above Figures, and FIG. 6 is an enlarged-scale sectional view taken on the line VI—VI in FIG. 5.

DETAILED DESCRIPTION OF THE INVENTION

The drawings relate to a disc cassette intended for an optically readable disc in conformity with the CD-ROM standard. Discs in conformity with this standard bear much resemblance to audio discs of the Compact-Disc type but are utilized as optical digital storage discs for use in conjunction with a computer. A disc of this type can be read on one side only and carries a label on its other side. The disc cassette is constructed in such a way that the portion of the closing member which projects from the enclosure is distinctly different when one side of the disc is viewed than when the other side of the disc is viewed. However, the enclosure need not be in a specific orientation relative to the closing member but can also be correctly coupled to the closing member in its inverted position.

The disc cassette shown in the drawing comprises a rotatable disc 1 and an external enclosure 2 having two main walls 3A and 3B, of which only the main wall 3A is shown in the drawings. The enclosure comprises three side walls in the form of a rear wall 4, a left-hand side wall 5, and a right-hand side wall 6. Opposite the rear wall 4 there is provided a front opening which is closed by a closing member 7 and which communciates with a disc-receiving space containing the disc 1. The closing member 7 comprises a front portion 7A which is situated outside the enclosure and a portion 7B situated within the enclosure. The part 7A spans the entire width of the enclosure and has a thickness which is substantially equal to the thickness of the enclosure. The portion 7B fits the disc-receiving space of the enclosure with some clearance and thus closes the front opening of the enclosure.

For latching the closing member 7 in the enclosure there are provided latching means in the form of two resilient latching fingers 8A and 8B which are disposed substantially in the sampe plane as the portion 7B of the closing member, also see FIG. 4. The closing member is injection-moulded from a plastics and the latching fingers 8A and 8B are integral with the closing member. They are separated from other portions of the closing member by recesses 9A and 9B, except at their fixed ends 10A and 10B respectively. At their free ends the latching fingers comprise abutment portions 11A and 11B respectively. During injection-moulding of the closing member 7 the latching fingers are shaped in such a way that they are slightly offset in the upward direction from the plane of the portion 7B, so that under pressure they are pivotable in a direction perpendicular to said plane against the resilience of the plastics material.

The enclosure 2 comprises two shells 2A and 2B which at their inner sides are each formed with latching recesses 12, see FIGS. 5 and 6. These latching recesses correspond to the latching fingers 8A and 8B and have peripheral walls 13 which cooperate with the abutment portions 11A and 11B of the latching fingers. Further, the latching recesses each have a bottom 14 which limits the pivotal movements of the latching fingers.

In the main walls 3A and 3B with the latching recesses 14 slots 15 are provided which extend from the front opening of the enclosure into the latching recess 14. The width of the slot 15 is smaller than the width of the latching recess 14 and is also smaller than the width of the abutment portions 11A and 11B respectively of the latching fingers 8A and 8B respectively. The front poriton 7A of the closing member which projects from the enclosure covers the end portion of the slot 15 adjacent the front opening of the enclosure. The latching fingers can each be pivoted towards the released position via an associated slot 15 by external means, not shown. Each of the latching fingers comprise a projection 16A and 16B respectively which engages in the slots 15. The gripping means of a playing apparatus can engage around the front portion 7A at the location of a slot 15, see in particular FIG. 4. After the latching fingers have been pivoted into the released positions the closing member can be slid out of the enclosure by the external gripping means. The closing member 7 is secured to a band-shaped engaging element 17 which encloses the disc 1 with clearance, so that when the closing member 7 is moved out of the enclosure the disc is also slid out of the enclosure.

The shell 2A shown in FIG. 5 is identical to the shell 2B. The latching recesses 12 and the slots 15 are disposed symmetrically relative to the centre of the disc 1 in the same way as the latching fingers 8A and 8B. This ensures that the closing member 7 together with the disc 1 can always be mounted correctly in the enclosure. The shells may be manufactured of transparent plastics, which has the advantage that the label of the disc contained in the enclosure can be read. Moreover, a user can see at once which side of the disc should face downwards when the disc cassette is inserted into an apparatus.

The transparent shells 2A and 2B may be provided with means which ensure that parts of the disc other than the central portion are not visible through the shells. In this way the disc label is always visible and other parts in the interior of the enclosure, such as the closing member 7 and the engaging element 17 are not visible and thus do not affect the appearance of the disc cassette. Suitable means are local printing or adhesive labels. FIG. 5 shows local frosting or texturing 18 of the shell 3A, in such a way that only the window 19 remains wholly transparent.

Although only one embodiment of the invention has been described, the invention is not limited thereto. For example, it is possible not to provide the latching recess 12 with a bottom 14, although in many cases the presence of a bottom will be desirable in order to reduce the likelihood of contaminants penetrating into the cassette and in view of a more attractive appearance of the cassette.

It is also possible to fill a slot with a corresponding part of the portion 7B of the main wall. It is merely essential that the latching finger can be pivoted through an opening in the main wall of the enclosure by external means and that a gripping means can move into the front opening of the enclosure via a slot in the main wall of the enclosure.

What is claimed is:

1. A disc cassette for use in a system for storing/reading information, which disc casette comprises:
    a rotatable disc (1),
    an external enclosure (2) having parallel main walls (3), side walls (4–6) and a front opening which communicates with a disc-receiving space,
    a closing member (7) which closes the front opening and which is situated partly inside (7B) and partly outside (7B) the enclosure (2), and
    latching means for latching the closing member (7) in the enclosure, which latching means comprise:
        at least one resilient latching finger (8A, B) which is situated substantially in the same plane as the portion of the closing member which is situated inside the enclosure, which latching finger is connected to said member by a fixed end (10A, B) and carries an abutment portion (11A, B) near a free end, and which is pivotable against spring force in a direction perpendicular to said plane from a latched portion to a released position, and
        a latching recess (12) which is provided in a side of a main wall (3A, 3B) facing the interior of the enclosure (2) and which comprises a circumferential wall (13) which is adapted to cooperate, by abutment, with the abutment portion (11A, B) of the latching finger (8A, B),
characterized
    in that the main wall (3A, B) in which the latching recess (14) is present is formed with a slot (15) which extends from the front opening of the enclosure into the latching recess,
    in that the width of the slot (15) is smaller than the width of the latching recess (14),
    in that the width of the slot is smaller than the width of the abutment portion (11A, B) of the latching finger, and
    in that the portion (7A) of the closing member (7) which projects from the enclosure covers the end portion of the slot which adjoins the front opening of the enclosure, in such a way that the latching finger (8A, B) can be pivoted towards the released position by external means and subsequently the closing member can be slid out of the enclosure by external gripping means which engage behind the portion of the closing member which covers the slot.

2. A disc cassette as claimed in claim 1, characterized
    in that the disc can be inscribed/read on one side only,
    in that the closing member comprises two latching fingers,
    in that the latching positions of the two latching fingers are situated at the same side of the closing member,
    in that the enclosure comprises two shells which are secured to one another and which have latching recesses and slots at identical locations, so that no matter in which of the two possible ways the closing member has been slid into the enclosure each latching finger always engages an associated latching recess with its abutment portion, and
    in that each of the shells has two latching recesses with slots which are disposed symmetrically relative to the centre of the front opening.

3. A disc cassette as claimed in claim 2, characterized in that the shells forming the enclosure are identical to each other.

4. A disc cassette as claimed in claim 1, characterized in that the enclosure is at least partly made of a transparent plastics, so that when the disc cassette is filled it is possible to distinguish one side of the disc from the other.

* * * * *